(12) United States Patent
Wild et al.

(10) Patent No.: US 11,797,750 B2
(45) Date of Patent: Oct. 24, 2023

(54) METHODS AND SYSTEMS FOR IDENTIFYING AND TAGGING OUTLINED OR CONVERTED TEXT

(71) Applicant: Global Graphics Software Limited, Cambridge (GB)

(72) Inventors: Nigel Wild, Stockport (GB); Martin Bailey, Cambridgeshire (GB)

(73) Assignee: GLOBAL GRAPHICS SOFTWARE LIMITED, Cambridge (GB)

(*) Notice: Subject to any disclaimer, the term of this patent is extended or adjusted under 35 U.S.C. 154(b) by 0 days.

(21) Appl. No.: 17/703,760

(22) Filed: Mar. 24, 2022

(65) Prior Publication Data

US 2023/0306188 A1    Sep. 28, 2023

(51) Int. Cl.
*G06K 15/02*    (2006.01)
*G06F 40/117*   (2020.01)
*G06F 40/109*   (2020.01)
*G06F 3/12*     (2006.01)
*G06F 40/166*   (2020.01)

(52) U.S. Cl.
CPC .......... *G06F 40/117* (2020.01); *G06F 3/1208* (2013.01); *G06F 3/1256* (2013.01); *G06F 40/109* (2020.01); *G06F 40/166* (2020.01)

(58) Field of Classification Search
None
See application file for complete search history.

(56) References Cited

U.S. PATENT DOCUMENTS

| | | | |
|---|---|---|---|
| 8,830,241 B1* | 9/2014 | Gorner | G06T 3/40 382/229 |
| 2004/0044958 A1* | 3/2004 | Wolf | G06F 40/117 715/255 |
| 2004/0093323 A1* | 5/2004 | Bluhm | G06F 16/9535 |
| 2009/0313539 A1* | 12/2009 | Ota | G06F 40/117 715/255 |
| 2016/0041949 A1* | 2/2016 | Gluck | G06F 3/0484 715/256 |
| 2017/0177175 A1* | 6/2017 | Lai | G06F 16/489 |

* cited by examiner

*Primary Examiner* — Dung D Tran
(74) *Attorney, Agent, or Firm* — Branch Partners PLLC; Bruce E. Black

(57) ABSTRACT

A method for modifying a printable file includes receiving the printable file; identifying an element representing one or more text characters in the printable file; tagging the element; and incorporating metadata in the printable file, wherein the metadata is associated in the printable file with the tagged element and includes the one or more text characters. A method for using a printable file including at least one tagged graphics object that represents one or more characters and associated metadata includes receiving the printable file; and performing an activity using the printable file and the metadata within the printable file.

20 Claims, 5 Drawing Sheets

METHODS AND SYSTEMS FOR IDENTIFYING AND TAGGING OUTLINED OR CONVERTED TEXT

FIELD

The present invention is directed to the area of processing identifying and tagging or marking outlined or other converted text in a file. The present invention is also directed to methods and systems for searching, preflighting, or replacing outlined or other converted text in a file.

BACKGROUND

Portable Document Format (PDF) provides a widely supported, robust method for delivering graphically rich documents that can represent the features for printing workflows. For example, in the label and packaging industries (or any other suitable industry) completed designs are commonly delivered by a brand owner or advertising agency to a printer/converter partner in the form of a PDF file or file in any other suitable file format.

It is common for any text in a design or other arrangement to be converted to outlines before the PDF file is delivered to the printing entity (for example, a print/converter partner or other printer or user.) That conversion replaces a text object that represents a specified series of characters, using a specified text encoding and in a specified font at a specified size, with one or more filled vector paths. Other file formats may include similar conversions.

As an example, if a font called Square is embedded in a PDF file and the character code 65 ('A' in most Western text encodings) draws a simple square, the document as originally designed might conceptually include the following instructions:

```
Select font Square at 11pt
show the string (A)
```

After conversion, the instructions could be replaced by the following (or the like):

```
Move to position 0, 0
    draw a path through 0, 8 then 8, 8, then 8, 0 and
then 0, 0
    close the path
    fill the path with color
```

This conversion facilitates ensuring that the design as printed appears as intended by the file originator (for example, as the design in the approval process performed by the brand owner before delivery to the printer/converter partner.) Such conversion may, for example, prevent or hinder the printer from altering the file accidentally or deliberately, prevent or hinder the design from being rendered for print using a different font that happens to have the same font name, or prevent or hinder differences arising from different font renderers, especially when the font in use is marginally invalid, for example, in character hinting (e.g., instructions in the character outlines to automatically tune the character outlines for output at different sizes and resolutions.)

On occasion, a design will be delivered to the printing entity without pre-converting text to outlines. This may occur because the originator wants the printing entity to make edits to text at the last minute. In such cases, the printing entity may choose to outline the text before returning the final PDF files to the originator, often to enhance the likelihood that all further orders for printing of that job will be returned to that same printing entity.

Outlining text has advantages including those described above, but there are also disadvantages. For example, outlined text is generally not searchable in the same way as text using live fonts. Outlined text is also generally not amenable to optical character recognition (OCR). Conventional systems often search for outlined text by first rendering the page to a raster format and then applying OCR, which is relatively slow, is not guaranteed to be completely accurate, and does not reliably return some data such as the name of the font used or the font size.

BRIEF SUMMARY

One embodiment is a method for modifying a file. The method includes receiving the file; identifying an element representing one or more text characters in the file, wherein the element is a graphics object; tagging the element; and incorporating metadata in the file, wherein the metadata is associated in the file with the tagged element and includes the one or more text characters.

Another embodiment is a system that includes at least one memory having instructions stored thereon; at least one processor coupled to the at least one memory and configured to execute the instructions to produce actions, the actions including receiving the file; identifying an element representing one or more text characters in the file, wherein the element is a graphics object; tagging the element; and incorporating metadata in the file, wherein the metadata is associated in the file with the tagged element and includes the one or more text characters.

In at least some embodiments, the metadata further includes a font of the one or more text characters. In at least some embodiments, the metadata further includes at least one of the following: a style of the one or more characters, a font size of the one or more characters, a natural language of the one or more characters, a fill color of the one or more characters, a stroke width of the one or more characters, a stroke color of the one or more characters, or a location of the element.

In at least some embodiments, the element is a text object when the file is received, the method or the actions further including converting the element from the text object into a graphics object. In at least some embodiments, the file is a printable file.

In at least some embodiments, the metadata includes lower level metadata and higher level metadata. In at least some embodiments, the higher level metadata is at a document or page level.

In at least some embodiments, the methods or the actions further include identifying at least one additional element representing one or more text characters in the file; tagging each of the at least one additional element; and incorporating additional metadata for each of the at least one additional element in the file. In at least some embodiments, the one or more text characters of the element and at least one of the at least one additional element form, in combination, a word.

In at least some embodiments, the system further includes a printing device, wherein the instructions further include printing an item using the file and the printing device.

A further embodiment is a method for using a file including at least one tagged graphics object that represents one or more characters and metadata that is associated in the file with the tagged element and includes the one or more text characters, the method including: receiving the file; and performing an activity using the file and the metadata within the file, wherein the activity is selected from: searching the metadata for text in the file that is represented by graphics objects; preflighting the file using the metadata; or replacing one or more characters in the at least one tagged graphics object using the metadata.

Yet another embodiment is a system that includes at least one memory having instructions stored thereon; at least one processor coupled to the at least one memory and configured to execute the instructions to produce actions, the actions including receiving the file; and performing an activity using the file and the metadata within the file, wherein the activity is selected from: searching the metadata for text in the file that is represented by graphics objects; preflighting the file using the metadata; or replacing one or more characters in the at least one tagged graphics object using the metadata. In at least some embodiments, this system and the system described above are combined into a single system.

In at least some embodiments, the file is a printable file. In at least some embodiments, the method or the system further includes printing an item using the printable file.

In at least some embodiments, the preflighting includes checking that at least one character represented by the at least tagged graphics object meets a font size requirement, font requirement, a style requirement, or a color requirement, wherein the metadata includes, respectively, a font size of the one or more characters, a font of the one or more characters, a style of the one or more characters, or a color of the one or more characters.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of processing identifying and tagging or marking outlined or other converted text in a file. The present invention is also directed to methods and systems for searching, preflighting, or replacing outlined or other converted text in a file.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The methods described herein can be performed using any type of processor and any suitable type of device that includes a processor.

A PDF file will be used herein as an example of a file that can be processed for printing and includes outlined text, but it will be understood that any other file suitable for processing for printing and including outlined text can be used instead of the PDF file. Outlined text will be used herein as an example of converted text which is text that is converted to from text to a graphics object (for example, described by vector paths.) The systems and methods are described in relation to labeling and packaging applications and the printing of a brand name or the like. It will be understood, however, that the systems and methods can find application in a variety of industries and printing any suitable items containing text elements.

There are a number of processes that may be applied to a print-ready Portable Document Format (PDF) file either by an originator of the PDF file (such as a brand owner or advertising agency, for label or packaging applications, or other file provider) or the printing entity (for example, a print/converter partner or other printer.) One example of such a process is searching print-ready files for specific text (for example, to discover which files or text should be updated because of a branding, ingredients, or regulatory change.) As indicated above, outlined text is generally not searchable in the same way as text using live fonts and is also not amenable to optical character recognition (OCR).

Another process that may be applied to a print-ready PDF file is preflighting to ensure that the file will print well. For instance, preflighting can include checking that all text is above a minimum size (in addition, the minimum size may also vary depending on the color of the text and its background.) As an example, the Ghent Working Group 2015 Packaging specifications for flexo printing require preflight processes to warn if text printed in a single ink is smaller than 5 pt or if text printed in a combination of multiple inks is smaller than 14 pt. However, it can be difficult to determine the size of 'text,' particularly when it may be difficult to identify which elements are 'text' because outlined text is generally not distinguishable from other graphics objects and the font size may not be readily determined from the outline description without conversion tables or formulas.

Preflighting can also include ensuring that printing requirements (for example, brand usage rules) are correct such as, for example, that a brand name (or other printed matter) always appears in a specific color, especially after a brand refresh which may introduce subtle changes to the color. However, it can be difficult to determine the color (or other aspects of printing requirements) of 'text,' particularly when it may be difficult to identify which elements are 'text' as outlined text is generally not distinguishable from other graphics objects.

In addition, preflighting can include identifying files to be adjusted in response to changes to regulatory or other requirements regarding text size, font, or font, such as, for example, recent European rules changes setting minimum text size for ingredients and requiring that the names of allergens in ingredients are emboldened. Again, it can be difficult to determine what to change when it may be difficult to identify which elements are 'text' as outlined text is generally not distinguishable from other graphics objects.

Other processes that may be applied to a print-ready PDF file include amending or replacing text (for example, when an ingredient has been replaced at short notice) or supporting manual checks of various aspects of the layout of specific text, such as, for example, identifying the location on the PDF page where that text falls and showing that area to an operator automatically. As with several of the other examples, it can be difficult to determine what to change when it may be difficult to identify which elements are 'text' as outlined text is generally not distinguishable from other graphics objects.

Methods and systems are described herein that mark or tag graphics objects that arise from converting text to outlines (or other graphical descriptions) and to associate metadata with those marked or tagged graphics objects. In at least some embodiments, the metadata can include one or more of the following: the character(s) represented by the graphics objects (which may also include the encoding of those characters), the font of the character(s), the style of the character(s) (e.g., bold, italic, oblique, or the like or any combination thereof), the font size of the character(s), the natural language of the text, the fill color, the stroke color, the stroke width, the location of the graphic object (for example, an origin location, an end location, or both or, as another example, a start position and an angle of rotation, or any other suitable location information), or the like or any combination thereof.

Figures 1A, 1B:
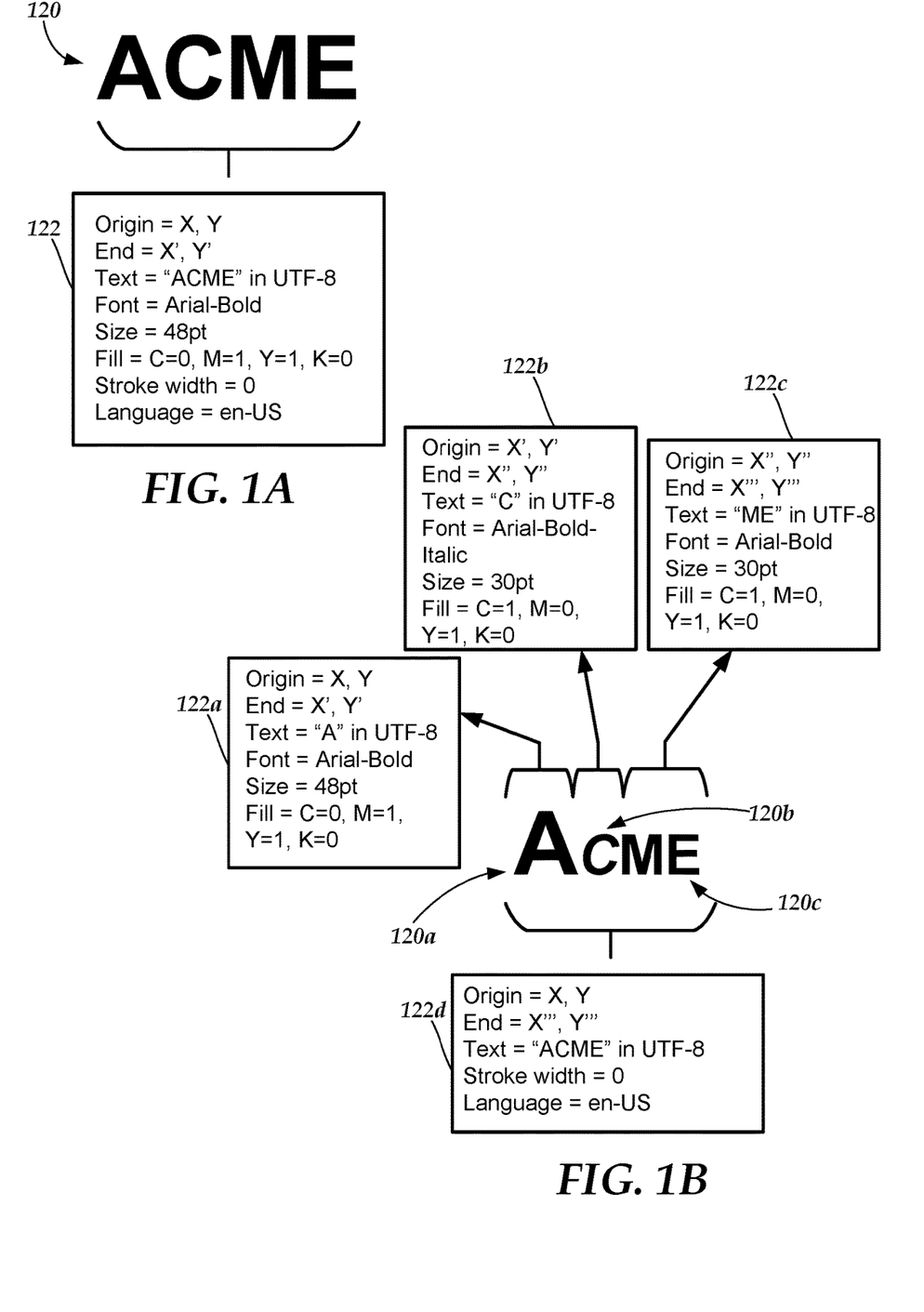
FIG. 1A illustrates one embodiment of a graphics object and associated metadata, according to the invention.
FIG. 1B illustrates one embodiment of a multiple graphics object arising from a single word and associated metadata, according to the invention.

FIG. 1A illustrates one example of a graphics object 120 (the word "ACME") and the corresponding metadata 122. The metadata 122 in this example includes the origin location, the end location, the characters represented by the graphics object, the font and style of the characters (Arial-Bold), the size of the characters (48 point), the fill color (red—C=0, M=1, Y=1, K=0), the stroke width (0), and the language (U.S. English).

If a single line of text, or even a single word or any other arrangement that is intended to be viewed or read together, uses multiple fonts (for example, only some letters in italic or bold or a different font), multiple font sizes, multiple colors, multiple natural languages, or the like or any combination thereof, the metadata associated with the graphics objects representing that text after outlining may be organized in a variety of different arrangements.

As one example, if the differences (for example, in font, size, color, language, or the like or any combination thereof) are not distinguished in the metadata, the whole line, word, or other arrangement may be marked or tagged as a single graphics object with the metadata limited to features that are the same for the entire graphics object.

As another example, each sequence of one or more characters having the same metadata (for example, a uniform font, size, color, language, or the like or any combination thereof) can be identified as a different graphics object.

It will be understood that the principles behind these two examples can be combined. For example, the metadata may include information about the font, size, and language and the characters can be divided up into graphics objects based on these characteristics, but the metadata may not include information about color and so the characters are not divided up based on color.

In at least some embodiments, the entire line, word, or other arrangement is divided up into graphics objects (with each graphics object containing one or more characters in sequence) based on one or more characteristics and the metadata associated with each graphics object provides information about the characteristic(s). In addition, metadata for combinations of two or more of the graphics objects (for example, a combination of graphics objects that form a word or phrase) can also be generated and can include information that is common for all of the graphics objects in the combination or information that describes the combination. Such nested metadata is decipherable by a file reader and may facilitate better searching of the text in the whole word or line, while retaining the preflighting advantages.

FIG. 1B illustrates one example of multiple graphics objects 120a, 120b, 120c (the word "ACME" split into three parts—"A", "C", "ME" due to differences in the font and size of the characters) and the corresponding metadata 122a, 122b, 122c, 122d. The metadata 122a, 122b, 122c for the individual graphics objects 120a, 120b, 120c in this example includes the origin location, the end location, the characters represented by the graphics object, the font and style of the characters (Arial-Bold for "A" and "ME" and Arial-Bold-Italic for "C"), the size of the characters (48 point for "A" and 30 point for "C" and "ME"), and the fill color (red for "A"— C=0, M=1, Y=1, K=0—and green for "C" and "ME"—C=1, M=0, Y=1, K=0). In addition, metadata 122d is provided for the combination of the graphics objects 120a, 120b, 120c and includes the origin location (X, Y) of the combination, the end location (X''', Y''') of the combination, the characters represented by the combination of graphics objects ("ACME"), the stroke width (0), and the language (U.S. English).

The additional metadata 122d for the combination can include elements that are in common among the graphics objects, such as stroke width and language, or elements that describe the combination, such as the characters and the origin/end locations of the combination, or the like or any combination thereof. The additional metadata may be useful for searching words or phrases that are otherwise separated into different graphics objects due to differences in font, style, size, or any other characteristic, but are, from a readability or visual viewpoint, related to each other.

In at least some embodiments, the systems and methods facilitate searching files for specific text that has been outlined or otherwise converted. In at least some embodiments, the systems and methods facilitate preflighting to ensure that the file will print well or that printing requirements (for example, brand usage rules are correct), or the like or any combination thereof. In at least some embodiments, the systems and methods facilitate amending or replacing outlined text.

Figure 2A:
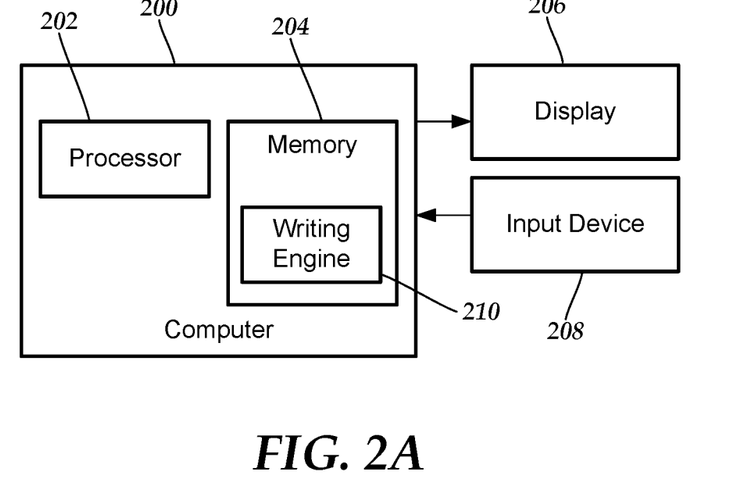
FIG. 2A is a block diagram of one embodiment of a writing system, according to the invention.
Figure 2B:
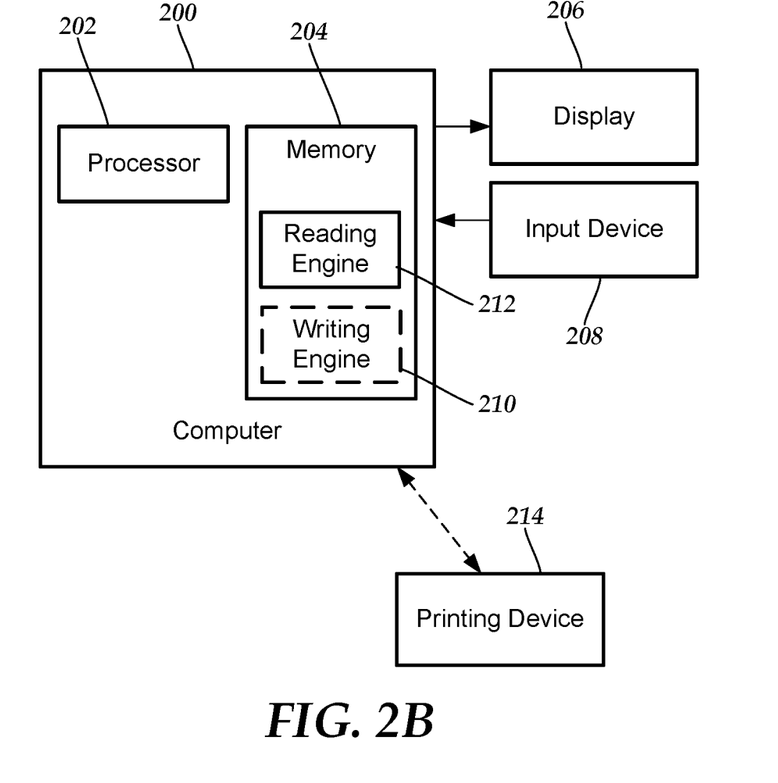
FIG. 2B is a block diagram of one embodiment of a reading system, according to the invention.

FIG. 2A illustrates one embodiment of a writing system and FIG. 2B illustrates one embodiment of a reading system (which may also be a writing system.) A writing system marks or tags the graphics object(s) and incorporates the corresponding metadata in the PDF file. In at least some embodiments, these functions are part of an application that outlines some or all of the text in the file. In at least some other embodiments, an application compares two files for the same original design: one using live fonts and one in which some or all of the text has been converted to outlines, and then marks or tags the graphics object(s) and generates the corresponding metadata in the PDF file. Any other suitable method for identifying converted text can be used by a writing system.

A reading system includes an application that is capable of searching a PDF file to extract the metadata (and potentially deriving additional metadata such as locations on the page). In at least some embodiments, the application uses the metadata for one or more search, preflight, or replacement processes. In at least some embodiments, the reading system passes the metadata to another application for searching, preflighting, replacing, or any other suitable processing or any combination of these processes.

Each of these systems can include a computer 200 or any other device that includes a processor 202 and a memory 204, a display 206, and an input device 208. In FIG. 2B, the reading system can be coupled to a printing device 214, such as a printer or press. The printing device 214 can be a digital press (for example, electrophotographic or inkjet presses), a conventional press (for example, (offset lithographic, flexographic, or gravure presses), an inkjet device, a laser printing device, or any other suitable printing device. Unless otherwise indicated, the terms "printing device" and "press" are used interchangeably herein. It will be understood that the writing system of FIG. 2A can also be coupled to a printing device 214. In some embodiments, one or more of the computer 200, display 206, or input device 208 can be part of the printing device 214.

The computer 200 can be a laptop computer, desktop computer, server computer, tablet, mobile device, smartphone, or other devices that can run applications or programs, or any other suitable device for processing information and for presenting a user interface. Alternatively or additionally, the computer 200 can be part of the printing device 214 or coupled (by wired or wireless coupling) to the printing device. The computer 200 can be local to the user or can include components that are non-local to the user including one or both of the processor 202 or memory 204 (or portions thereof). For example, in some embodiments, the user may operate a terminal that is connected to a non-local computer. In other embodiments, the memory can be non-local to the user.

The computer 200 can utilize any suitable processor 202 including one or more hardware processors that may be local to the user or non-local to the user or other components of the computer. The processor 202 is configured to execute instructions provided to the processor, as described below.

Any suitable memory 204 can be used for the computer 200. The memory 204 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The display 206 can be any suitable display device, such as a monitor, screen, display, or the like. The input device 208 can be, for example, a keyboard, mouse, touch screen, track ball, joystick, voice recognition system, or any combination thereof, or the like and can be used by the user to interact with a user interface.

The writing system of FIG. 2A (and optionally the reading system of FIG. 2B) includes a writing engine 210 stored as instructions in the memory 204 which are executed in the processor 202. The writing engine 210 can include an application that marks or tags the graphics object(s) and generates the corresponding metadata in the PDF file. In at least some embodiments, the writing engine 210 can also outline some or all of the text in the file.

The reading system of FIG. 2B includes a reading engine 212 stored as instructions in the memory 204 which are executed in the processor 202. The reading engine 212 can include an application that is capable of searching a PDF file to extract the metadata (and potentially deriving additional metadata such as locations on the page), and either using that data for search, preflight, and replacement, or passing that data to another application to be searched, preflighted, replaced, or otherwise processed.

Figure 6:
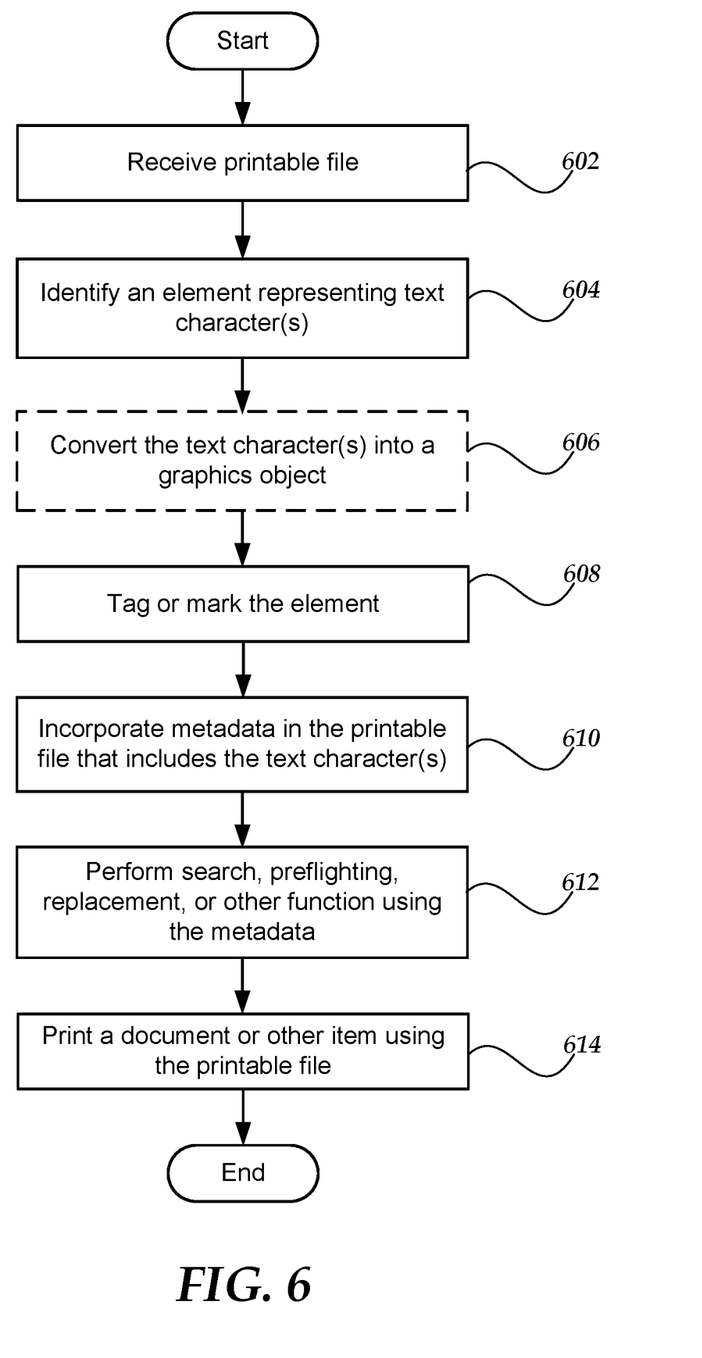
FIG. 6 is a flowchart of one embodiment of a method for modifying a printable file or for printing a document or other item from a printable file, according to the invention.

FIG. 6 illustrates one embodiment of a method for modifying a printable file or for printing a document or other item from a printable file. In step 602, the printable file is received. In step 604, an element representing one or more text character(s) is identified. It will be understood that there may be multiple elements in the printable file and any number of those elements can be identified in this step. Moreover, a single word or phrase may include two or more elements, as illustrated in FIG. 1B.

In step 606, the text character(s) are converted into a graphics object. It will be understood that this step can occur at the point illustrated in FIG. 6, prior to step 604, or after step 608 or step 610 or the printable file may already include text character(s) converted into graphics object(s). The conversion can occur at any one or multiple points (for different text character(s)) in this method.

In step 608, the element is tagged or marked, as described above. In step 610, metadata is generated and incorporated into the file for the element. The metadata includes the text character(s) and can include other information about the element or text character(s) as described above. The processes of steps 602 to 610 can be performed by a writing system, such as the writing system illustrated in FIG. 2A.

In step 612, searching, preflighting, replacement of one or more characters, or some other function can be performed using the metadata. This process may be performed using a reading system, such as the reading system illustrated in FIG. 2B.

In step 614, the document or other item (for example, a label or package) is printed using the printable file.

In at least some embodiments, the metadata associated with the graphics object(s) for the character(s) is not stored in the same encoding as was used in the original PDF file before the text was converted to outlines. In at least some embodiments, the encoding using live fonts may have been constrained by the encodings that could be applied using the specified font, whereas using a common encoding, such as Unicode UTF-8, may be more useful for all characters represented in metadata.

In at least some embodiments, additional metadata can be added at a higher level in the PDF file. In at last some embodiments, such higher level metadata can facilitate faster searching of a file to find the marked or tagged graphics objects. Where graphics objects representing outlined text are identified in combination with higher-level metadata and the lower-level metadata, items such as the character(s) represented, the font, the size, or any other suitable metadata can be stored in either or both types of metadata. As an example, the higher level metadata can include the character(s) represented by the outline text. For example, with respect to FIGS. 1A and 1B, higher level metadata can include "ACME" to facilitate text searching of the document or page.

In at least some embodiments, the higher level metadata can be stored at the document level (for example, accessed from the PDF file Catalog object), stored at the page level (for example, accessed from a PDF Page object), associated with a Form XObject within the PDF file (such as, for example, a partial page in an imposed sheet of labels or packages), or the like or any combination thereof.

Figure 3A:
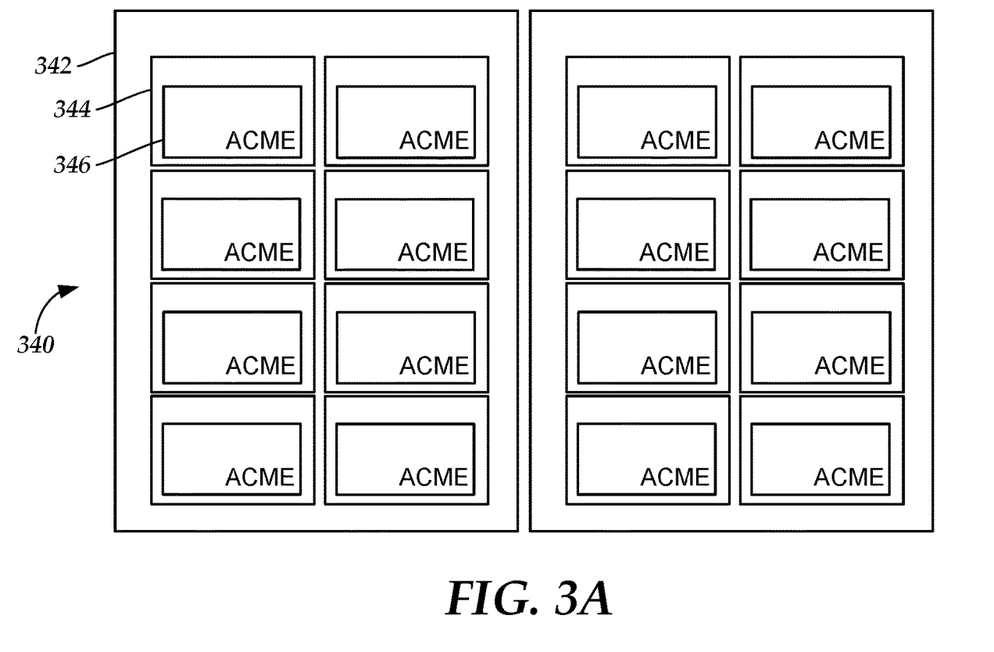
FIG. 3A illustrates one embodiment of a two-page document with sixteen labels, each label having a common portion with the word "ACME"
Figure 3B:
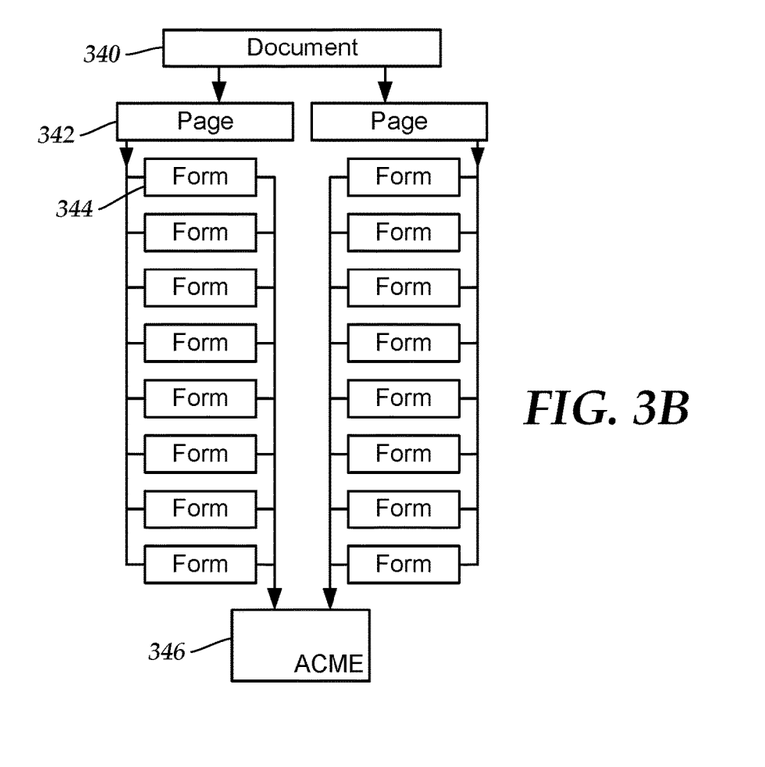
FIG. 3B is a block diagram illustrating elements of the document of FIG. 3A.

FIGS. 3A and 3B illustrate one example of a document 340 with two pages 342. Each page includes eight instances of a step-and-repeat label 344. Each label 344 is represented by a single Form XObject with a portion 346 represented by a child Form XObject including the word "ACME" within that child. This is an example of a common structure in which the graphics (i.e., portion 346) that are common to all instances of the label 344 are recorded into a Form that is referenced from all of the label Forms, as illustrated in FIG. 3B. The label Forms may also contain data that is unique to each label, such as serial numbers or unique graphics (not shown). FIG. 3B is a representation of the relationship between the document 340, pages 342, labels 344 (represented by a Form), and the common portion 346 of the labels (represented by a child Form). In this example, there is just one common portion 346 that is repeated sixteen times in the document, once for each of the labels 344 (i.e., Forms).

As another example, a PDF file is delivered by the brand owner (or their representative) and represents a single label, carton, or the like. In at least some embodiments, the high-level metadata may be at the document or page level in the file supplied by the brand owner (or their representative.) The print/converter partner may impose the PDF file based on the press and finishing capabilities of their equipment. The imposition by the print/converter partner may be a simple step-and-repeat, replicating the design for the single station (one label or package) in a regular grid. Alternatively, it may be more complex, especially for folding cartons or corrugated workflows where more efficient substrate utilization can be achieved by nesting the designs rather than treating them as rectangles. In at least some embodiments, each station is encoded in the imposed PDF file as a Form XObject, and any high-level metadata from the supplied single-station PDF file is then likely to be initially associated with the Form XObject that represents a single station in the imposed document. In at least some embodiments, any location data within either the high-level metadata or associated directly with the graphics objects representing the outlined text is relative to the coordinate system of that XObject rather than to the page coordinate system. In at least some embodiments, metadata is added at the page or document level to ensure that the presence of marked, outlined text can be determined efficiently, without needing to search the entire imposed structure of pages and XObjects.

Any suitable method for marking or tagging graphics objects as outlined text can be used. As an example, one method for marking or tagging graphics objects as outlined text utilizes the PDF "optional content" structure. Conventionally, the PDF "optional content" structure is often used in label & packaging workflows for identifying different classes of graphics (for example, die lines, white inks, varnishes, legends, bleed areas, live areas, or the like) on a page to facilitate preflight processing. As described herein, the "optional content" structure can also be used to mark or tag graphics objects that represent one or more characters.

In at least some embodiments, outlined text that is included in a page or Form XObject is marked or tagged as "optional content" by immediately preceding it with the BDC (begin a marked-content sequence) operator with the tag /OC and an identifier or name for an "optional content group" (OCG) (taking the place of a property list), and immediately following the outlined text with the EMC (end a marked-content sequency) operator.

As an example, based on the pseudo-code example presented in the Background above, the PDF contents stream could resemble

```
/OC /ACME_outlined BDC
Move to position 0, 0
draw a path through 0, 8 then 8, 8, then 8, 0 and
then 0, 0
close the path
fill the path with color
EMC
```

In this example, the name or identifier for the marked or tagged graphics output is "ACME_outlined".

In at least some embodiments, the metadata associated with the graphics object is stored in the identified OCG. In at least some embodiments, a unique OCG, and associated name or identifier, is provided for each graphics object (or combination of graphics objects) marked as outlined text.

In at least some embodiments, when the graphics object representing outlined text forms the whole of an XObject, and that text is uniform in font and size, then that XObject may specify an OCG by name by including an OC entry. Associated metadata can be stored in that OCG.

Figure 4:
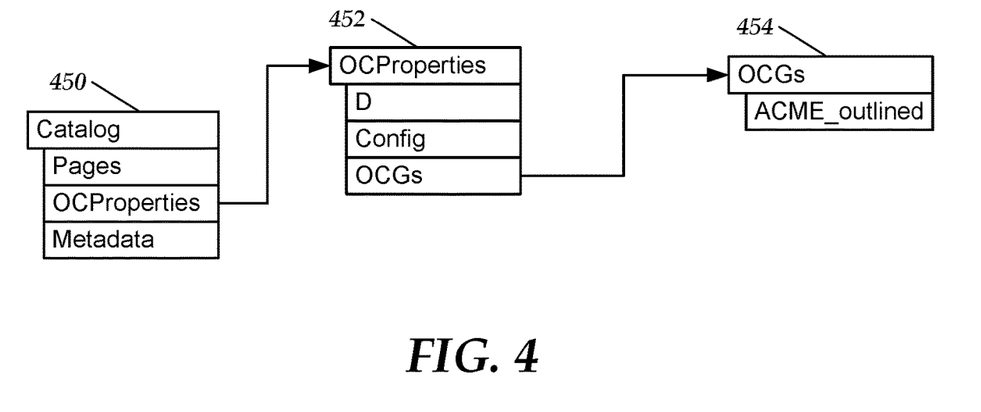
FIG. 4 is a block diagram of PDF structures for a printable file including metadata for a tagged or marked graphics object labeled "ACME_outlined", according to the invention.

This method for marking or tagging graphics objects representing outlined text can facilitate high-level access because, at least in some embodiments, all OCGs 454 in the PDF file are referenced from the OCProperties 452 dictionary in the document-level Catalog 450 object, as illustrated in FIG. 4. In at least some embodiments, when outlined text is tagged as optional content, the OCProperties dictionary in the document-level PDF Catalog object can provide efficient access to enumerate outlined text sequences and to read the associated metadata.

Another method for tagging or marking graphics objects as outlined text is to use the PDF "marked content" structures with a tag other than/OC. When outlined text is included in the content stream of a page or Form XObject, the outlined text is preceded by the BMC or BDC operator and followed by the EMC operator. When metadata is stored at this low level, the BDC operator is preferably used and the metadata can be stored in the associated property list. Each tagged or marked graphics object representing outlined text is identified with either a tag or mark used for the BMC operator or, preferably, an identifier included in the associated properties list. The tagged or marked graphics objects may be combined with high-level metadata in the file to facilitate quick and efficient identification.

The PDF standard includes the ability to embed metadata in a variety of different structures, including at the document level or in Page objects or XObjects. In at least some embodiments, the metadata is encoded as XMP (Extensible Metadata Platform), which may be extended with schemas for proprietary or standardized data structures. XMP in PDF files, at least at the document level, is often described as being amenable to extraction without a tool that fully understands the PDF object structure. This can facilitate embedding metadata in a file so that it may be accessed by multiple different tools in multiple workflows.

In at least some embodiments, XMP can provide a high-level entry point to identify the presence and character sequences of outlined text within a document. In at least some embodiments, XMP can be used to supplement low-level tagging or marking for relatively quick searching to see if a file contains specific outlined text by including a schema designed for the purpose.

In at least some embodiments, metadata for a graphics object representing outlined text is included in the XMP (possibly duplicating metadata held at a low level in a marking or tagging structure.) This metadata may also enable preflight based on the font, size, color, or the like that is stored in the XMP.

Figure 5:
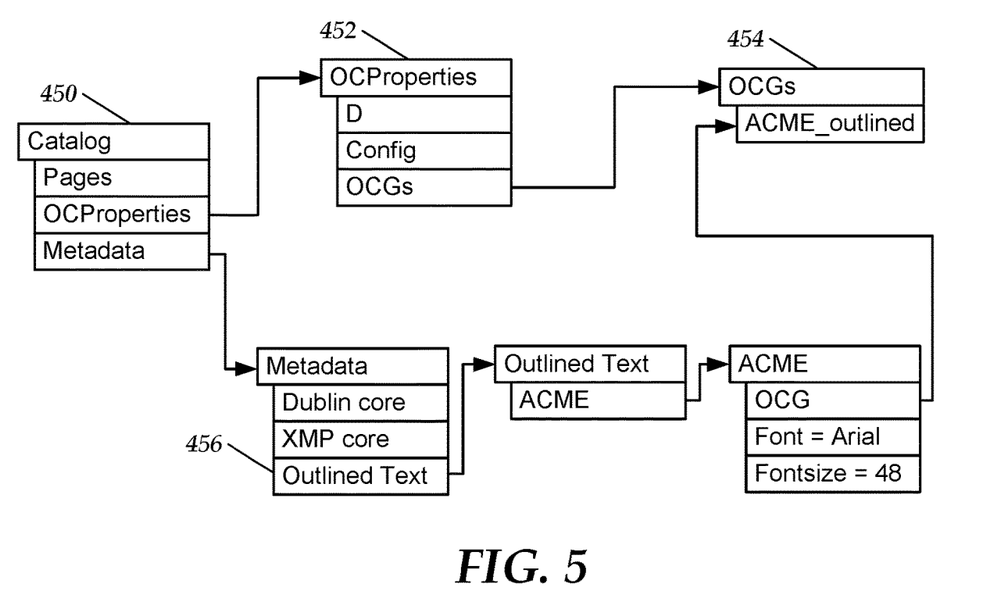
FIG. 5 is a block diagram of PDF structures for a printable file including metadata in two structures for a tagged or marked graphics object labeled "ACME_outlined" and representing the outlined text "ACME", according to the invention.

In at least some embodiments, XMP can be a useful adjunct to "optional content" as described above. In at least some embodiments, as illustrated in FIG. 5, the metadata is stored in the OCG 454 and a cross-reference (for example, the OCG name) included from the XMP 456 to the OCG. Alternatively, the metadata is stored only in the XMP (with a reference to the OCG name) or is stored in both locations. In at least some embodiments, storage only in the XMP may promote ease of extraction by tools that do not fully understand or exploit the structure of a PDF file.

As an example, a single record in the XMP may store one or more of the following: the character sequence represented by the outlined text, the OCG name if optional content is used for marking or tagging, the tag or mark name or an identifier stored in the properties list associated with tagged or marked content, the font, the size, the color, the natural language, or the like or any combination thereof.

PDF is not defined only for use in print workflows, but also has many different uses for digital file delivery. As a result, PDF includes mechanisms to mark up a page in a logical structure; to identify headings, tables, images, or the like in support of assistive technologies; for reflowing pages for different form factors of devices in which a file is to be viewed; or the like. Structure tagging or marking can be used in association with tagged or marked graphics object(s) to provide a high-level route to identify graphics objects representing outlined text (for example, using the ActualText property.)

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the united states is:

1. A method for modifying a file, the method comprising:
   receiving, by a processor, the file;
   identifying, by the processor, an element representing one or more text characters in the file, wherein the element is a graphics object;
   automatically tagging, by the processor, the element;
   automatically incorporating, by the processor, metadata in the file, wherein the metadata is associated in the file with the tagged element and comprises the one or more text characters; and
   preflighting the file using the metadata, wherein the preflighting comprises checking that at least one of the one or more text characters represented by the tagged element meets a font size requirement, a font requirement, a style requirement, or a color requirement, wherein the metadata further comprises, respectively, a font size of the one or more text characters, a font of the one or more text characters, a style of the one or more text characters, or a color of the one or more text characters.

2. The method of claim 1, wherein the metadata comprises the font of the one or more text characters.

3. The method of claim 1, wherein the metadata further comprises at least one of the following: a natural language of the one or more characters, a fill color of the one or more characters, a stroke width of the one or more characters, a stroke color of the one or more characters, or a location of the element.

4. The method of claim 1, wherein the element is a text object when the file is received, the method further comprising converting the element from the text object into the graphics object.

5. The method of claim 1, wherein the metadata comprises lower level metadata and higher level metadata.

6. The method of claim 5, wherein the higher level metadata is at a document or page level.

7. The method of claim 1, further comprising
   identifying, by the processor, at least one additional element representing one or more text characters in the file, wherein each of the at least one additional element is a graphics object;

automatically tagging, by the processor, each of the at least one additional element; and automatically incorporating, by the processor, additional metadata for each of the at least one additional element in the file.

8. The method of claim 7, wherein the one or more text characters of the element and at least one of the at least one additional element form, in combination, a word.

9. The method of claim 1, wherein the file is a printable file.

10. A method for using a file comprising at least one tagged graphics object that represents one or more text characters and metadata that is associated in the file with the at least one tagged graphics object and comprises the one or more text characters, the method comprising:

receiving the file; and preflighting the file using the metadata, wherein the preflighting comprises checking that at least one of the one or more text character represented by the at least one tagged graphics object meets a font size requirement, a font requirement, a style requirement, or a color requirement, wherein the metadata comprises, respectively, a font size of the one or more text characters, a font of the one or more text characters, a style of the one or more text characters, or a color of the one or more text characters.

11. The method of claim 10, wherein the file is printable file.

12. The method of claim 11, further comprising printing an item using the printable file.

13. The method of claim 10, further comprising replacing one or more of the one or more text characters represented by the at least one tagged graphics object using the metadata.

14. A system, comprising:

at least one memory having instructions stored thereon;

at least one processor coupled to the at least one memory and configured to execute the instructions to produce actions, the actions comprising receiving, by the processor, the file;

identifying, by the processor, an element representing one or more text characters in the file, wherein the element is a graphics object;

automatically tagging, by the processor, the element;

automatically incorporating, by the processor, metadata in the file, wherein the metadata is associated in the file with the tagged element and comprises the one or more text characters; and preflighting the file using the metadata, wherein the preflighting comprises checking that at least one of the one or more text characters represented by the element meets a font size requirement, a font requirement, a style requirement, or a color requirement, wherein the metadata comprises, respectively, a font size of the one or more text characters, a font of the one or more text characters, a style of the one or more text characters, or a color of the one or more text characters.

15. The system of claim 14, wherein the element is a text object when the file is received, wherein the actions further comprise converting the element from a text object into the graphics object.

16. The system of claim 14, wherein the actions further comprise searching the metadata for text in the file that is represented by the graphics object.

17. The system of claim 14, further comprising a printing device, wherein the instructions further comprise printing an item using the file and the printing device.

18. The system of claim 14, wherein the metadata comprises lower level metadata and higher level metadata.

19. The system of claim 18, wherein the higher level metadata is at a document or page level.

20. The method of claim 14, wherein the actions further comprise replacing one or more of the one or more text characters represented by the graphics object using the metadata.

* * * * *